(12) United States Patent
Vornwald et al.

(10) Patent No.: US 11,009,430 B2
(45) Date of Patent: May 18, 2021

(54) METHOD AND ARRANGEMENT FOR MONITORING AN OPERATION OF A PLANT

(71) Applicant: Robert Bosch GmbH, Stuttgart (DE)

(72) Inventors: Sebastian Vornwald, Wuerzburg (DE); Adrien Mouaffo Tiadjio, Gerlingen (DE); Christoph Maier, Kleinostheim (DE); Jochen Mueller, Backnang (DE); Patric Brand, Sennfeld (DE); Peter Rehbein, Erlabrunn (DE); Roman Ritter, Stuttgart (DE); Thomas Inderwies, Frammersbach (DE); Wolfgang Rueppel, Frammersbach (DE)

(73) Assignee: Robert Bosch GmbH, Stuttgart (DE)

( * ) Notice: Subject to any disclaimer, the term of this patent is extended or adjusted under 35 U.S.C. 154(b) by 323 days.

(21) Appl. No.: 16/176,856

(22) Filed: Oct. 31, 2018

(65) Prior Publication Data

US 2019/0137364 A1    May 9, 2019

(30) Foreign Application Priority Data

Nov. 3, 2017   (DE) ..................... 10 2017 219 543.6

(51) Int. Cl.
*G06N 3/08* (2006.01)
*G01M 99/00* (2011.01)
*G05B 23/02* (2006.01)
*G06N 3/04* (2006.01)
*H04W 84/18* (2009.01)

(52) U.S. Cl.
CPC ....... *G01M 99/005* (2013.01); *G05B 23/0254* (2013.01); *G06N 3/04* (2013.01); *G06N 3/08* (2013.01); *H04W 84/18* (2013.01)

(58) Field of Classification Search
USPC ......................................... 702/183
See application file for complete search history.

(56) References Cited

U.S. PATENT DOCUMENTS

| 6,208,953 B1* | 3/2001 | Milek ...................... G07C 3/00 703/7 |
| 2008/0052040 A1* | 2/2008 | Renner .................. G05B 21/02 702/182 |
| 2014/0298100 A1* | 10/2014 | Grimm ..................... B67B 3/26 714/37 |
| 2018/0364132 A1* | 12/2018 | Knaup ................ G01M 13/045 |

* cited by examiner

*Primary Examiner* — Paul D Lee
(74) *Attorney, Agent, or Firm* — Maginot, Moore & Beck LLP

(57) ABSTRACT

A method for monitoring operation of a plant via a plurality of sensors includes: a) determining respective temporal waveforms of measurement values recordable with the sensors during normal operation of the plant, b) determining dependencies between the determined temporal waveforms of the measurement values, c) recording respective temporal waveforms of measurement values with the sensors during the operating mode to be monitored of the plant, and d) deciding whether a fault is present in the operating mode to be monitored of the plant by evaluating the recorded temporal waveforms on the basis of the determined dependencies.

13 Claims, 3 Drawing Sheets

METHOD AND ARRANGEMENT FOR MONITORING AN OPERATION OF A PLANT

This application claims priority under 35 U.S.C. § 119 to patent application no. DE 10 2017 219 543.6, filed on Nov. 3, 2017 in Germany, the disclosure of which is incorporated herein by reference in its entirety.

BACKGROUND

The disclosure relates to a method and an arrangement for monitoring an operation of a plant, in particular an industrial production plant.

In order to monitor industrial plants, it is known to measure a wide range of parameters, such as a temperature. If, for example, a measured parameter exceeds a set limit value, the plant can be automatically shut down to protect against damage. In such monitoring processes, however, it is often difficult to reliably distinguish between critical situations in which, for example, a shutdown is necessary, and non-critical situations in which no action is required.

On this basis, the object of the disclosure is to solve, or at least reduce, the technical problems described in connection with the technology of the prior art. In particular, a method and an arrangement for monitoring operation of a plant will be presented, which can be used to distinguish between critical and non-critical situations particularly reliably.

SUMMARY

These objects are achieved with a method and an arrangement for monitoring a plant in accordance with the features of the disclosure. Further advantageous embodiments of the method and the arrangement are specified in the respective dependent claims. The features listed individually in the claims can be combined with each other in any technologically meaningful way and can be supplemented by explanatory statements from the description, wherein further design variants of the disclosure are demonstrated.

The object is partly achieved by a method for monitoring operation of a plant by means of a plurality of sensors, which method comprises at least the following steps:
a) determining respective temporal waveforms of measurement values recordable with the sensors during normal operation of the plant,
b) determining dependencies between the temporal waveforms of the measurement values determined in accordance with step a),
c) recording respective temporal waveforms of measurement values with the sensors during an operating mode to be monitored of the plant, and
d) deciding whether a fault is present in the operating mode to be monitored of the plant by evaluating the temporal waveforms recorded in step c) on the basis of the dependencies determined in step b).

The method described is designed and configured in particular for monitoring industrial production systems. The plant can be, in particular, a machine with which products can be produced either partially or wholly automatically. The plant can also be a working machine, such as an excavator or a crane.

The plant preferably comprises a plurality of components and assemblies, such as one or more motors, hydraulic elements, pneumatic elements, electronic components, pipes, valves and/or switches.

In the operation of the plant the components of the plant can undergo, for example, a change in temperature (in particular in the case of actively powered components such as motors). Components can also be subject to vibrations. For example, an operation of a motor can cause vibrations in the motor itself and/or in other components. The activation of a valve can also cause a vibration or a brief acceleration of the valve itself. Magnetic fields can also be produced during operation of the plant. The magnitude and/or direction of magnetic fields can be used to derive information on the operation of the plant. Also, the light intensity in the area of the plant or a part of the plant can vary during its operation.

In particular, the monitoring of the plant can be performed in particular by recording and/or evaluating measurement values, which allow conclusions to be drawn as to whether the plant is operating correctly. These can be in particular measurement values for parameters which directly allow conclusions as to the level of strain on and/or damage to the plant or a component thereof and/or to a fault or anomaly in the operation of the plant. If, for example, a particularly high temperature is measured on a motor, this may indicate overheating of the motor, and thus a strain and/or impending damage to the motor.

The monitoring of the plant can be effected or carried out by means of at least one of the following parameters:
a temperature,
a magnetic field (which can be characterized by a direction and/or a magnitude),
an acceleration (which can be characterized by a direction and/or a magnitude),
a light intensity.

The plant can comprise suitable sensors for detecting the parameters to be recorded. In particular, the plant can comprise one or more temperature sensors, magnetic field sensors, accelerometers and/or light sensors.

In principle, a failure of the plant could be detected from a single measurement parameter. For example, if a motor temperature exceeds a limit value specified as a fixed value, a fault can be assumed to exist. However, such a procedure can only be used to detect extreme situations (such as the overheating of the motor above a load limit). Irregularities in the operation of the plant for which no limit value is exceeded cannot be detected in this way.

With the method described, associations between different measurement variables can be detected and used to identify otherwise undetectable irregularities in the operation of the plant. Thus, for example, it is possible to take into account the possibility that in the normal operation of the plant, a motor being switched on leads to an increase in temperature of the motor and causes vibrations in an electronic component located near the motor. If vibrations are measured in the electronic component, this can be classified as a non-critical situation if the operation of the motor is detected by measuring a corresponding temperature on the motor. If the motor temperature indicates that it is switched off, however, then the existence of the vibration in the electronic component can indicate a fault (provided there is no other source of such vibrations in the normal operation of the plant, such as an additional motor).

With the method described here, such dependencies between different measurement parameters can be determined for the normal, fault-free operation of the plant. To achieve this, in step a) respective temporal waveforms of measurement values recordable with the sensors are determined during normal operation of the plant.

The plant can be operated in various operating modes. Thus, for example, components of the plant can be switched on or off. Also, the components can each be operated in different ways. For example, a motor can operate at different speeds. Depending on which components of the plant are operated at a particular point in time and in which manner, for example a specific temperature can be present in a particular component of the plant. It can thus also have an influence on the period of time for which a certain component exists in a certain condition. If, for example, a motor is switched on, this can lead to a delayed increase in temperature in another component.

With step a), preferably at least some of the possible operating modes of the plant (preferably all possible operating modes of the plant) are covered. This means in particular that the temporal waveforms of each of the measurement values recordable with the sensors are determined for at least some of the operating modes, or for all operating modes.

In step b) dependencies between the temporal waveforms of the measurement values determined according to step a) can be identified. In step b) an operation is preferably performed to determine how a first parameter behaves when a second parameter, or even other parameters, change. Thus in step b) it can be determined, for example, that an increase in vibrations in an electronic component will occur when a motor is turned on, which causes the motor temperature to increase. If a plurality of operating modes is covered in step a), then a plurality of operating modes is preferably also covered in step b).

A dependency can be qualitative or quantitative. So, for example, it can be determined qualitatively that an increase in a first parameter causes an increase in a second parameter. This can also be determined in a way that allows for a time delay. Thus, for example, it may be determined that the second parameter increases by a non-quantified amount or a quantified amount only after a quantitatively determined time interval. A dependency could also in particular take the form of a mathematical relation between one time-dependent parameter and one or more other time-dependent parameters. Characteristics of the temporal waveforms of different parameters can also be related to each other. Thus, for example, it may be detected that a specific characteristic occurs earlier or later, and/or is manifested in a different way, in a first temporal waveform than in a second temporal waveform.

The steps a) and b) are preferably carried out in the specified order. The sequence can in particular be carried out once. This means the steps a) and b) can be carried out during the design of the plant or during the construction of the plant. If a plurality of identical systems is produced, steps a) and b) can be performed once and the resulting findings applied to all of the identical systems. Also, an existing plant can be configured for a monitoring procedure in accordance with the method described. In this case, the steps a) and b) are preferably carried out once during or after the setting up of the plant.

It is possible to carry out the steps a) and b) multiple times. This allows, in particular, changes to the plant to be taken into account (for example, due to redesign of the plant and/or due to wear of components).

The temporal waveforms are recorded in step a), preferably by recording measurement values during the normal operation of the plant. Alternatively or additionally it is preferable that the temporal waveforms are determined in step a) by means of a simulation.

The temporal waveforms and/or their dependencies determined by the steps a) and b) are preferably stored in electronic form in such a way that they can be accessed during the operation of the plant. The plant preferably has an evaluation unit with which the monitoring can be carried out during the operation of the plant. The temporal waveforms and/or their dependencies determined by the steps a) and b) are preferably stored in the evaluation unit. In particular, the temporal waveforms and their dependencies determined by the steps a) and b) can already be stored in the evaluation unit at the delivery or assembly stage of the plant. It is also possible for the temporal waveforms and their dependencies to be determined in accordance with the steps a) and b) only after delivery and assembly of the plant and in particular using the evaluation unit. This is particularly practical in complex plants, in which deviations from the original planning can occur during the actual assembly or where it is difficult to predict, for example, the propagation of vibrations throughout the plant before its assembly on the basis of design drawings.

Due to the temporal waveforms and their dependencies determined in accordance with steps a) and b), the manner in which the plant will behave in normal operation is known. If a fault occurs, this can be detected in a deviation from the known behavior. This means that it is possible to distinguish between critical and non-critical situations on the basis of the totality of the plurality of measurement parameters, and therefore particularly reliably.

In step c) respective temporal waveforms of measurement values are recorded with the sensors during the operating mode to be monitored of the plant.

The operating mode to be monitored of the plant can be in particular an operation of the plant as intended following initial commissioning. In the operation to be monitored, for example, products can thus be produced.

If the monitored operation of the plant is fault-free, it can be assumed that the temporal waveforms of the measurement values recorded in accordance with step c) do not differ from the temporal waveforms determined in accordance with step a). If the plant can be operated in different operating modes, this applies at least to the extent that the temporal waveforms recorded in step c) correspond to the temporal waveforms determined in step a) for the corresponding operating mode.

If on the other hand, a fault is present, then this can lead to a discrepancy between the temporal waveforms recorded according to step c) and the waveforms determined according to step a). Such a deviation therefore enables a fault to be detected. In order to obtain a particularly reliable differentiation between critical and non-critical situations, in the method described particular use is made of the dependencies between the temporal waveforms determined in step b).

In step d), by evaluating the temporal waveforms recorded in step c) on the basis of the dependencies determined in step b), a decision is made as to whether a fault is present in the monitored operation of the plant.

If the temporal waveforms recorded according to step c) have the dependencies determined according to step b), then fault-free operation can be assumed. If, for example, an increase in temperature of a motor and an increase in a vibration level of an electronic component are detected, which was determined in step b) as a dependency, then no fault is assumed. If, on the other hand, an increase in the vibration of the electronic component is detected without a temperature increase in the motor and no such dependency was identified in step b), a decision is preferably made in step d) that a fault exists.

All sensors can be designed and configured to measure the same physical parameter.

In this context a physical parameter is to be understood to mean a property that can be measured at different times in different locations. Examples of physical parameters include a temperature, an acceleration, a magnetic flux density and a light intensity. If, for example, the temperature is measured on a motor at a first point in time and on a valve at a second point in time, both measurements are still deemed to be a measurement of the same physical parameter, the temperature. While the motor temperature and the valve temperature are indeed different parameters, they are not different physical parameters.

In this embodiment, for example, the temperature can be measured as the physical parameter at different locations in the plant. The limitation to one physical parameter can simplify the method described, because dependencies between measurements of different physical parameters can be particularly complicated and difficult to predict.

Alternatively, it is preferred that the majority of the sensors is designed and configured for measuring different physical parameters.

In another preferred embodiment of the method, at least step d) is performed with an evaluation unit to which the measurement values from at least one of the sensors recorded in step c) are transmitted by contactless communication.

The evaluation unit preferably comprises a computer which can be used to carry out at least step d). In step c) the measurement values recorded with the sensors are preferably received by the evaluation unit and combined using this to form the temporal waveforms. In this respect step c) is also preferably carried out using the evaluation unit.

Preferably, the temporal waveforms and/or their dependencies obtained in accordance with steps a) and b) are stored in the evaluation unit. It is also preferred, however, that step b) is performed using the evaluation unit. The temporal waveforms in step a) can also be carried out with the evaluation unit to the extent that the measurement values recorded with the sensors can be received by the evaluation unit and combined using this to form the temporal waveforms, and that the dependencies can be determined from these using the evaluation unit. Also, the control unit can be used to perform simulations to determine the temporal waveforms according to step a). In particular, however, these simulations can also be carried out with an external computer, wherein the results of the simulation are stored in the evaluation unit.

Suitable methods of contactless communication are in particular a communication via radio, Bluetooth®, WLAN, infrared and/or mobile radio. Thus a plant can be set up to be monitored in accordance with the method described without large amounts of cable having to be laid around the plant.

In another preferred embodiment of the method the transmission is performed by contactless communication discontinuously.

A discontinuous transmission is intended in particular to mean that the measurement values are not transmitted immediately after being recorded. Instead, a plurality of measurement values is preferably recorded, temporarily stored in a memory buffer allocated to the sensor and transmitted in groups. This means that energy can be saved for the transmission, because a connection does not need to be permanently maintained. It is sufficient that the connection is established at certain discrete transmission times. At such transmission times the measurement values recorded since the last transmission time can then be transmitted. In other words, measurements are "collected" and then transmitted in packets.

In another preferred embodiment of the method, a respective time stamp is added to the measurement values recorded in step c).

Preferably, the measurement values in step c) are recorded as value pairs formed of the measurement value and the time of the measurement.

In particular, this embodiment is preferred when the measurement values are transmitted to the evaluation unit discontinuously. Thus, a process of combining the measurement values can take place at any time after the recording of the measurement values.

As an alternative to the present embodiment, the individual measurement values can be recorded without time stamps and, for example, inserted into the temporal waveform in the evaluation unit after entering the same. In so doing, the time of receipt can be considered to be the time of the measurement. This is possible in particular for a continuous transmission of the measurement values. Provided the time between recording and incorporation into the temporal waveform is equal for all measurements, a correct temporal waveform can also be obtained in this way. In the case of discontinuous transmission, the measurement values can be combined to form the temporal waveform, for example, under the assumption that the measurement values are recorded at equal time intervals. In this case, the measurement values can be numbered, for example, and combined to form the temporal waveform in accordance with the numbering.

In another preferred embodiment of the method, the dependencies are determined in step b) with at least one (artificial) neural network using a learning process.

The neural network can be in particular a machine learning device or be comprised thereby. In particular, the neural network can be implemented as a piece of software and/or hardware. The neural network preferably comprises a plurality of artificial neurons, with which a learning process modeled after a brain can take place.

The neural network is preferably trained with the measurement values determined in accordance with step a), so that the neural network in accordance with step b) learns relationships between the temporal waveforms. Thus, for example, it is possible to learn how a particular parameter behaves as a function of other parameters at a specific point in time. For example, it is possible to learn that a temperature increase in a motor regularly causes a temperature to rise in an electronic component with a time delay. If such a behavior of the two temperatures is then measured in step c), this can be classified as a non-critical situation.

The training is carried out under normal, fault-free operating conditions, i.e. with a fully functional plant in the target state. In the operating mode to be monitored of the plant ("in the field") it can then be decided according to step d) whether the temporal waveforms satisfy the previously learned dependencies. If not, this is an indication of a fault.

If the plant can be operated in different operating modes, the training is preferably carried out using at least some of the operating modes, preferably using all of these operating modes. A neural network can be trained in particular in such a way that it learns a plurality of different dependencies between parameters (corresponding to the different operating modes). In the operation to be monitored, the operating mode which is currently in use does not then need to be entered manually, for example.

In another preferred embodiment of the method, time derivatives of the temporal waveforms recorded in step c)

are formed in step d) and taken into account in the decision as to whether a fault is present in the operating mode to be monitored of the plant.

Changes in the measurement values can be detected particularly readily from the corresponding time derivatives. Therefore, the use of temporal derivatives can improve the accuracy of the described method.

As a further aspect, an arrangement for monitoring an operation of a plant in accordance with the method described will be presented. The plant comprises at least a plurality of sensors and an evaluation unit which is connected to at least one of the sensors using contactless communication.

The particular advantages and design features for the described method are applicable and transferable to the arrangement, and vice versa.

In a preferred embodiment of the arrangement, the evaluation unit comprises at least one neural network for determining the dependencies in step b) by a learning process.

In another preferred embodiment of the arrangement, at least one of the sensors is arranged in a respective autonomous sensor unit.

An autonomous sensor unit is understood here to mean a component having at least one sensor that can be operated without a cable connection. In addition, the sensor unit preferably comprises a microprocessor for processing the measurement values. The sensor unit preferably also has a communication module for the transmission of measurement values, in particular using contactless communication. The communication module can comprise, in particular, an antenna. Furthermore, the sensor unit preferably has a battery for supplying power (in particular to the at least one sensor, the microprocessor and/or the communication module).

Alternatively or in addition to sensors arranged in autonomous sensor units, other sensors can also be used in the described method, for example, those which are connected to the evaluation unit via cable connections. Also, measurement values that are available via a CAN-bus gateway, for example, can also be used.

In another preferred embodiment of the arrangement, each sensor unit has a clock, wherein the clocks of the sensor units are synchronized with each other.

In particular, the measurement values can be provided with a time stamp by means of the clock.

As a further aspect, a computer program is presented, which is configured for carrying out the method described.

The particular advantages and design features described for the method are applicable and transferable to the computer program.

As a further aspect, a machine-readable data carrier is presented, on which the described computer program is stored.

The particular advantages and design features for described the method are applicable and transferable to the data carrier.

BRIEF DESCRIPTION OF THE DRAWINGS

The disclosure as well as the technical background will be explained in more detail below on the basis of the figures. The figures show an exemplary embodiment, to which the disclosure is not limited, however. For the avoidance of doubt, it should be noted that the technical features illustrated in the figures can also be combined with features of other figures and/or the description without requiring other technical features of a figure to be incorporated. Where there is a technical necessity to combine expressions of one technical feature with those of another, this will be explicitly pointed out or referred to, so that these features can be otherwise freely combined.

Shown schematically are.

DETAILED DESCRIPTION

Figure 1:
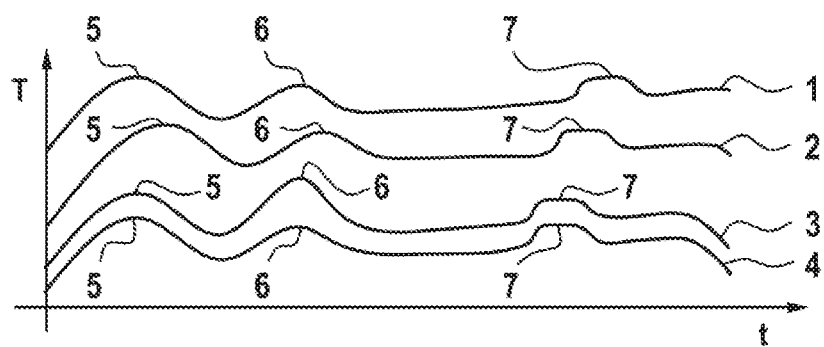
FIG. 1: temporal waveforms of measurement values that can be recorded in a fault-free operation of a plant.
Figure 3:
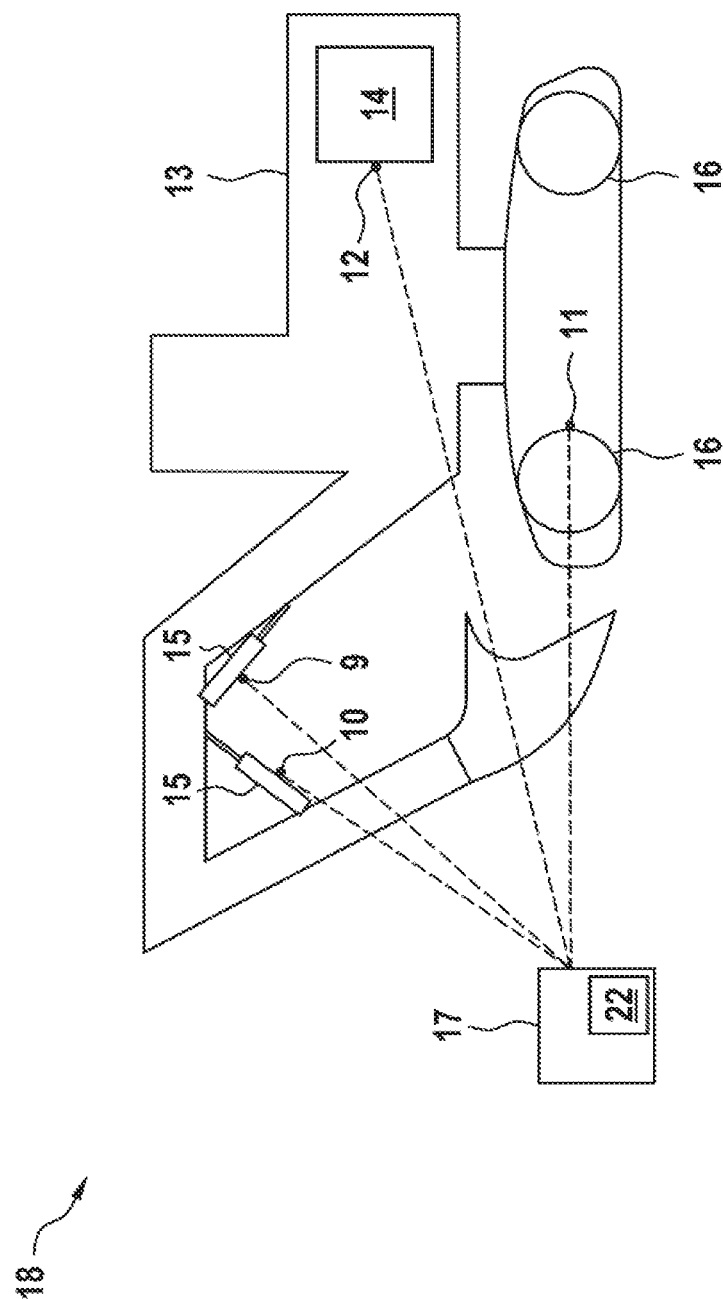
FIG. 3: the plant with an arrangement for monitoring the plant, with which the measurement values shown in FIGS. 1 and 2 were obtained.

FIG. 1 shows a first temporal waveform 1, a second temporal waveform 2, a third temporal waveform 3 and a fourth temporal waveform 4 of temperatures which can be recorded at different points of a plant (shown in FIG. 3). The measurement values shown are those which can be recorded for a fault-free operation of the plant. The temporal waveforms 1, 2, 3, 4 can be determined, for example, by measurement or by simulation.

The temporal waveforms 1, 2, 3, 4 differ essentially by a respective temporally constant temperature difference from one another. It is also apparent that the temporal waveforms 1, 2, 3, 4 each have a plurality of characteristics 5, 6, 7. In the case of characteristics 5, 6, 7, the temporal waveforms 1, 2, 3, 4 do not differ merely by a temporally constant temperature difference. A first characteristic 5, for example, occurs at the same time for the first temporal waveform 1, the third temporal waveform 3 and the fourth temporal waveform 4 and at a later time for the second temporal waveform 2. This is also the case for a second characteristic 6. In contrast to the first characteristic 5, the temporal waveforms 1, 2, 3, 4 additionally differ in the second characteristic 6 by the degree of expression of the second characteristic 6. Thus, the second characteristic 6 is more pronounced in the third temporal waveform 3 than in the other temporal waveforms 1, 2, 4. A third characteristic 7 is equally pronounced in all temporal waveforms 1, 2, 3, 4 at slightly different points in time.

Figure 2:
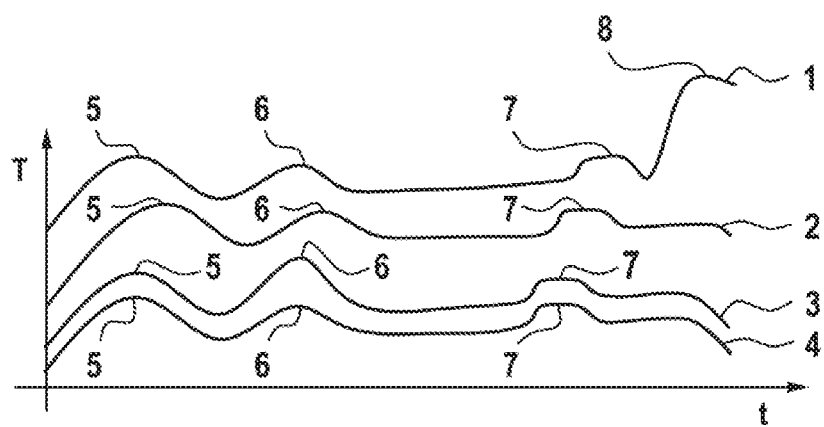
FIG. 2: temporal waveforms of measurement values of the parameters shown in FIG. 1 in an operating mode to be monitored of the plant.

FIG. 2 shows the same temporal waveforms 1, 2, 3, 4 as FIG. 1. Here, however, it is not the fault-free operation which is shown, but a (real) operating mode to be monitored of the plant. In this case the first temporal waveform exhibits a fourth characteristic 8 which was not present in the fault-free operation. Accordingly, the existence of a fault can be inferred.

FIG. 3 shows a plant 13. A first sensor 9, a second sensor 10, a third sensor 11 or a fourth sensor 12 are provided on a motor 14, on two hydraulic units 15 and on a chain drive 16 respectively. The sensors 9, 10, 11, 12 are temperature sensors. The first sensor 9 can be used to obtain the first temporal waveform 1 from FIGS. 1 and 2. The second sensor 10 can be used to obtain the second temporal waveform 2 from FIGS. 1 and 2. The third sensor 11 can be used to obtain the third temporal waveform 3 from FIGS. 1 and 2. The fourth sensor 12 can be used to obtain the fourth temporal waveform 4 from FIGS. 1 and 2.

The motor 14, the two hydraulic units 15 and the chain drive 16 are all components of the plant 14, the properties of which can be monitored during operation of the plant 13. Using the sensors 9, 10, 11, 12, measurement values can be recorded and transmitted to an evaluation unit 17. The evaluation unit 17 comprises a neural network 22.

The evaluation unit 17 and the sensors 9, 10, 11, 12 are part of an arrangement 18 for monitoring the plant 13.

Figure 4:
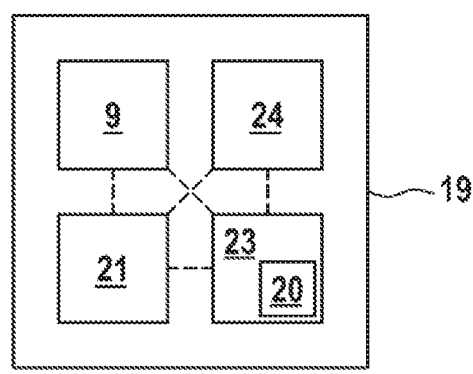
FIG. 4: a sensor unit of the arrangement of FIG. 3, and FIG. 5: a method for monitoring the plant of FIG. 3.

The sensors 9, 10, 11, 12 may be arranged, in particular, in a respective sensor unit (which is not shown in FIG. 3). FIG. 4 shows a sensor unit 19, which comprises the first sensor 9, for example. In addition, the sensor unit 19 comprises a battery 21, a microprocessor 23 with a clock 20, and a communication module 24. The clocks 20 of the sensor units 19 of the individual sensors 9, 10, 11, 12 are synchronized with one another.

Figure 5:

FIG. 5 shows a method for monitoring an operation of the plant 13 of FIG. 3 using the sensors 9, 10, 11, 12, comprising the steps:

a) determining respective temporal waveforms 1, 2, 3, 4 of measurement values recordable with the sensors 9, 10, 11, 12 during normal operation of the plant 13, b) determining dependencies between the temporal waveforms 1, 2, 3, 4 of the measurement values determined in accordance with step a), c) recording respective temporal waveforms 1, 2, 3, 4 of measurement values with the sensors 9, 10, 11, 12 during an operating mode to be monitored of the plant 13, and d) deciding whether a fault is present in the operating mode to be monitored of the plant 13 by evaluating the temporal waveforms 1, 2, 3, 4 recorded in step c) on the basis of the dependencies determined in step b).

The temporal waveforms 1, 2, 3, 4 determined in accordance with step a) are shown in FIG. 1. The temporal waveforms 1, 2, 3, 4 recorded in step c) are shown in FIG. 2. At least step d) is performed using the evaluation unit 17, to which the measurement values of the sensors 9, 10, 11, 12 recorded in step c) are transmitted by discontinuous contactless communication. By means of the clocks 20 of the sensor units 19 a respective time stamp is added to the measurement values. The dependencies in step b) are determined using the neural network 14 by a learning process. In step d) time derivatives of the temporal waveforms 1, 2, 3, 4 recorded in step c) are formed and taken into account in the decision as to whether a fault is present in the operating mode to be monitored of the plant 13.

LIST OF REFERENCE NUMERALS 1 first temporal waveform
2 second temporal waveform
3 third temporal waveform
4 fourth temporal waveform
5 first characteristic
6 second characteristic
7 third characteristic
8 fourth characteristic
9 first sensor unit
10 second sensor unit
11 third sensor unit
12 fourth sensor unit
13 plant
14 motor
15 hydraulic unit
16 chain drive
17 evaluation unit
18 arrangement
19 sensor unit
20 clock
21 battery

The invention claimed is:

1. A method for monitoring operation of a plant via a plurality of sensors, each of the plurality of sensors associated with a respective one of a plurality of plant components, comprising:
    obtaining respective measurement values with each of the plurality of sensors during normal operation of the plant;
    determining respective temporal waveforms of the respective measurement values;
    determining dependencies between the determined temporal waveforms of the respective measurement values;
    recording respective temporal waveforms of measurement values with the plurality of sensors during an operating mode to be monitored of the plant; and
    deciding whether a fault is present in the operating mode to be monitored of the plant by evaluating the recorded temporal waveforms on the basis of the determined dependencies.

2. The method according to claim 1, wherein each of the plurality of sensors are configured to measure the same physical quantity.

3. The method according to claim 1, wherein at least deciding whether a fault is present in the operating mode to be monitored of the plant is performed with an evaluation unit, to which the recorded measurement values from at least one of the plurality of sensors are transmitted by contactless communication.

4. The method according to claim 3, wherein the transmission is performed discontinuously by contactless communication.

5. The method according to claim 1, wherein a respective time stamp is added to the recorded measurement values.

6. The method according to claim 1, wherein the dependencies are determined with at least one neural network by a learning process.

7. The method according to claim 1, wherein time derivatives of the recorded temporal waveforms are formed and taken into account in the decision as to whether a fault is present in the operating mode to be monitored of the plant.

8. An arrangement for monitoring operation of a plant, comprising:
    a plurality of sensors, each of the plurality of sensors associated with a respective one of a plurality of plant components; and
    an evaluation unit connected to at least one of the sensors via contactless communication, the arrangement configured to:
        determine respective temporal waveforms of respective measurement values obtained by each of the plurality of sensors during normal operation of the plant,
        determine dependencies between the determined temporal waveforms of the respective measurement values,
        record respective temporal waveforms of measurement values with the plurality of sensors during an operating mode to be monitored of the plant, and
        decide whether a fault is present in the operating mode to be monitored of the plant by evaluating the recorded temporal waveforms on the basis of the determined dependencies.

9. The arrangement according to claim 8, wherein the evaluation unit has at least one neural network configured to determine the dependencies by a learning process.

10. The arrangement according to claim 8, wherein at least one of the plurality of sensors is arranged in a respective autonomous sensor unit.

11. The arrangement according to claim 10, wherein the at least one of the plurality of sensors includes at least two of the plurality of sensors, and each respective autonomous sensor unit has one clock, and wherein the clocks of the respective autonomous sensor units are synchronized with each other.

12. A non-transitory machine-readable storage medium storing a computer program configured to carry out a method for monitoring operation of a plant via a plurality of sensors, each of the plurality of sensors associated with a respective one of a plurality of plant components, the method including:

determining respective temporal waveforms of respective measurement values obtained from the plurality of sensors during normal operation of the plant, determining dependencies between the determined temporal waveforms of the respective measurement values, recording respective temporal waveforms of measurement values with the plurality of sensors during an operating mode to be monitored of the plant, and deciding whether a fault is present in the operating mode to be monitored of the plant by evaluating the recorded temporal waveforms on the basis of the determined dependencies.

13. The computer program according to claim 12, wherein the computer program is stored on a non-transitory machine-readable storage medium of an evaluation unit.

* * * * *